US008308035B2

(12) United States Patent
Polewarczyk et al.

(10) Patent No.: US 8,308,035 B2
(45) Date of Patent: Nov. 13, 2012

(54) ROOF RACK ASSEMBLY WITH TRANSLATION OF PIVOTABLE ROOF RACK BOW

(75) Inventors: Joseph M. Polewarczyk, Rochester Hills, MI (US); Kevin G. Kolpasky, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 299 days.

(21) Appl. No.: 12/845,799

(22) Filed: Jul. 29, 2010

(65) Prior Publication Data

US 2012/0024922 A1 Feb. 2, 2012

(51) Int. Cl.
*B60R 9/045* (2006.01)

(52) U.S. Cl. ........................................................ 224/321

(58) Field of Classification Search .................. 224/309, 224/316, 319, 321, 324–326, 329, 402–403
See application file for complete search history.

(56) References Cited

U.S. PATENT DOCUMENTS

| | | | | |
|---|---|---|---|---|
| 5,511,709 | A * | 4/1996 | Fisch | 224/321 |
| 6,286,739 | B1 * | 9/2001 | Stapleton | 224/321 |
| 7,090,103 | B2 * | 8/2006 | Aftanas et al. | 224/321 |
| 2006/0163297 | A1 | 7/2006 | Moreau | |
| 2009/0242599 | A1 | 10/2009 | Stahl et al. | |

* cited by examiner

*Primary Examiner* — Justin Larson
*Assistant Examiner* — Adam Waggenspack
(74) *Attorney, Agent, or Firm* — Quinn Law Group, PLLC

(57) ABSTRACT

A roof rack assembly includes a first roof rail and a second roof rail spaced a first distance from one another on the vehicle roof. The first roof rail has a first slot extending partially along the length of the first roof rail. A first bow member is connected at a first pivot member to the first roof rail at the first slot. A first linkage member has a first portion connected at a second pivot member to the first bow member and a second portion connected at a third pivot member to the first roof rail. The first linkage member pulls the first pivot member toward the third pivot member so the first bow member translates in the first slot as the first bow member is pivoted away from the first rail.

16 Claims, 4 Drawing Sheets

26 44 40 50 46 4 4 38 20 34

ROOF RACK ASSEMBLY WITH TRANSLATION OF PIVOTABLE ROOF RACK BOW

TECHNICAL FIELD

The invention relates to a vehicle roof rack assembly having deployable roof rack bows that translate.

BACKGROUND

Roof rack assemblies are often secured to vehicle roofs for supporting cargo above the roof. Roof rack assemblies often have longitudinally-arranged roof rails. Transverse roof rack bows, sometimes referred to as cross members, may be used to span the distance between the roof rails. Roof rack bows can contribute to aerodynamic drag and wind noise, so some designs allow the bows to be removed from the roof when not in use, or to be stowed in the roof rails. On some vehicles, the transverse distance between the roof rails is greater than a desired fore-aft spacing between the roof rack bows for supporting cargo. Some designs configure the stowed length of the roof rack bows to accommodate the desired fore-aft spacing and allow the roof rack bows to telescope in length to extend between the roof rails when deployed. Telescoping roof rack bows can be difficult for an operator to manually extend so that they reach across the roof between the roof rails.

SUMMARY

A roof rack assembly for a vehicle roof is provided with bow members that translate as they pivot to satisfy both a lateral span between roof rails as well as fore-aft spacing requirements. The roof rack assembly includes a first roof rail and a second roof rail spaced a first distance from one another on the vehicle roof. The first roof rail has a first slot extending partially along the length of the first roof rail. A first bow member is connected at a first pivot member to the first roof rail at the first slot. A first linkage member has a first portion connected at a second pivot member to the first bow member and a second portion connected at a third pivot member to the first roof rail. The first linkage member pulls the first pivot member toward the third pivot member so the first bow member translates in the first slot as the first bow member is pivoted away from the first rail from a stowed position substantially parallel with the first roof rail to a deployed position in which the first bow member spans the first distance between the first and second roof rails.

An actuator may be used to at least partially pivot the first bow member toward the deployed position. For example, the actuator may be a spring or an electronic solenoid.

The first roof rail may form a cavity extending at least partially along the length of the first roof rail so that the first bow member can be at least partially nested within the cavity when in the stowed position.

The above features and advantages and other features and advantages of the present invention are readily apparent from the following detailed description of the best modes for carrying out the invention when taken in connection with the accompanying drawings.

DETAILED DESCRIPTION

Figure 1:
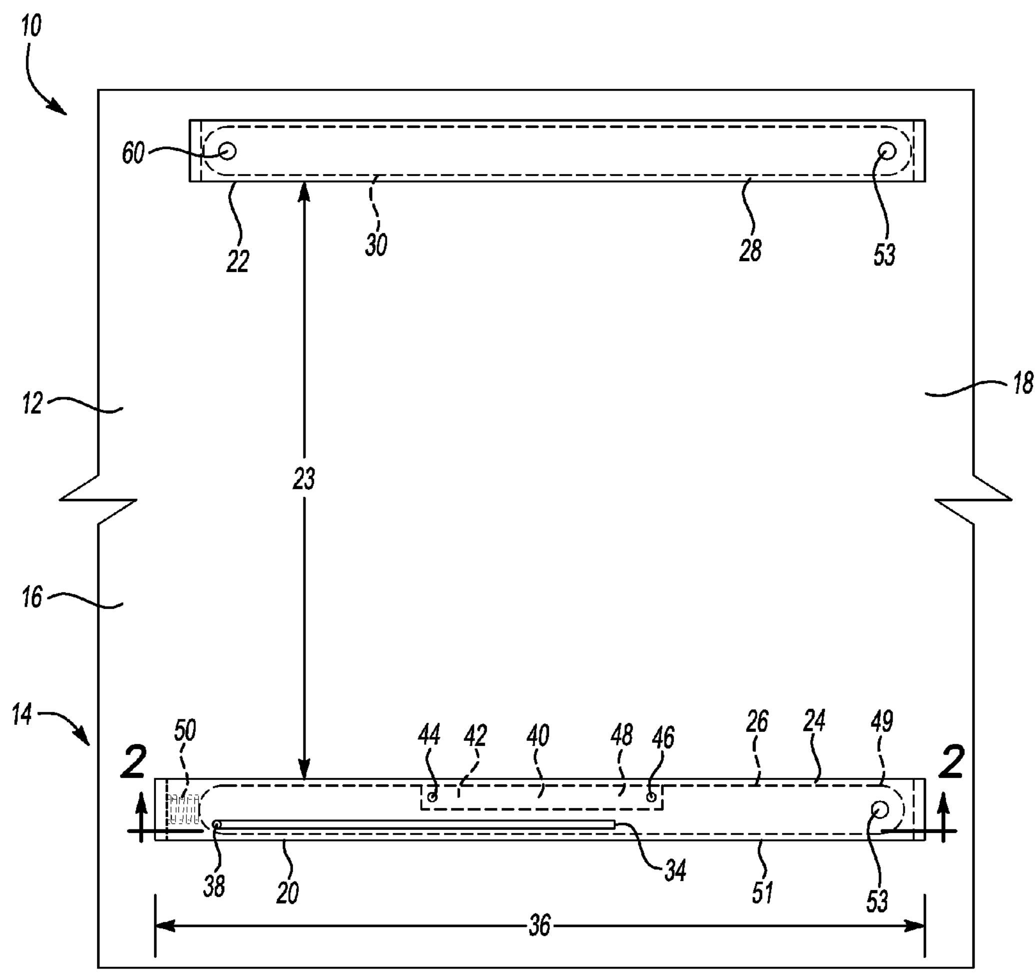
FIG. 1 is a schematic fragmentary illustration in plan view of a vehicle roof with a first embodiment of a roof rack assembly having bow members shown in stowed positions within roof rails and having a spring actuator.

Referring to the drawings, wherein like reference numbers refer to like components throughout the several views. FIG. 1 shows a vehicle 10 having a roof 12 with a roof rack assembly 14 secured thereto. The front of the vehicle roof 12, i.e., that portion that is generally forward when the vehicle 10 is driven in a forward direction is indicated as 16, while the rear of the vehicle roof 10 is indicated as 18.

The roof rack assembly 14 includes a first elongated roof rail 20 and a second elongated roof rail 22, both extending in a generally fore-aft or longitudinal direction on the vehicle 10. The roof rails 20, 22 are generally parallel with one another and are spaced by a transverse first distance 23. Although in this embodiment, the roof rails 20, 22 are parallel with one another, non-parallel arrangements are also possible.

The roof rail 20 forms a cavity 24 in which a first bow member 26 is shown nested in a stowed position within the cavity 24. Similarly, the roof rail 22 forms a cavity 28 in which a second bow member 30 is shown nested in a stowed position within the cavity 28. Each of the cavities 24, 28 opens in a direction facing the opposing roof rail 20, 22. As discussed below, each of the bow members 26, 30 is pivotable out of the respective cavity 24, 28 to a deployed position, shown in FIG. 5, in which the bow members 26, 30 span the first distance 23 and are a second distance 32 apart from one another. The second distance 32 is less than the first distance 23 due to translation of the first bow member 26 during deployment from the stowed position to the deployed position as discussed below.

Figure 2:
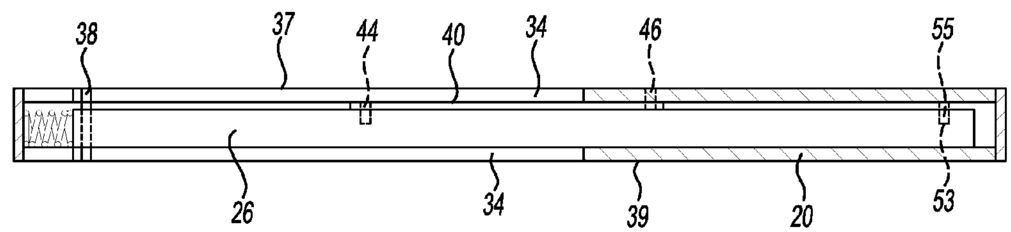
FIG. 2 is a schematic partially cross-sectional side view illustration of one of the roof rails with a bow member therein taken at lines 2-2 in FIG. 1.

Referring again to FIG. 1, the first roof rail 20 has a first slot 34 extending partially along a length 36 of the first roof rail 20. The first slot 34 may extend completely through the upper wall 37 and the lower wall 39 of the first roof rail 20, as shown in FIG. 2, or may be an upper channel formed in the upper wall 37 at the cavity 24 and a lower channel formed in the lower wall 39 at the cavity 24, but not extending all the way through the walls 37, 39. A first pivot member 38, which may be a simple pin, is positioned in the slot 34 and extends through an opening in the first bow member 26 so that the first bow member 26 is pivotally connected to the first roof rail 20 by the first pivot member 38 at the slot 34.

A first linkage member 40 is pivotally secured at a first portion 42 to the first bow member 26 by a second pivot member 44 extending through an opening in the first linkage member 40 and into the first roof rail 20. A third pivot member 46 extends through an opening in a second portion 48 of the first linkage member 40 to pivotally secure the first linkage member 40 to the first roof rail 20. As best shown in FIG. 2, the second pivot member 44 extends downward from the first linkage member 40 into the first bow member 26 while the third pivot member 46 extends upward from the first linkage member 40 into the first roof rail 20.

Referring to FIG. 1, an actuator 50 is positioned in the cavity 24 between one end of the first bow member 26 and the first roof rail 20. In this embodiment, the actuator 50 is a coil spring that is compressed when the first bow member 26 is in the stowed position of FIG. 1. When an end portion 49 of the first bow member 26 is pulled out of the cavity 24 toward the second roof rail 22, the actuator 50 urges the first pivot pin 38 along the slot 34 toward the third pivot member 46, as shown by the intermediate position of the first bow member 26 in FIG. 3. Pivoting the first bow member 26 also causes the first linkage member 40 to pull the first pivot member 38 toward the second pivot member 44. The actuator may instead be positioned near the end portion 49 of the first bow member 26, in the cavity 24 between the outer wall 51 of the first roof rail 20 and the first bow member 26. In either case, an optional depressible pin 53 may selectively be received in an opening 55 of the first bow member 26 to lock the first bow member 26 to the first roof rail 20 in the stowed position, and depressed to release the first bow member 26 for pivoting to the deployed position of FIG. 5. An opening through the first roof rail 20 allows access to depress the pin 53. Locking the first bow member 26 via the pin 53 keeps the actuator 50 in the compressed position of FIG. 1.

Figure 7:
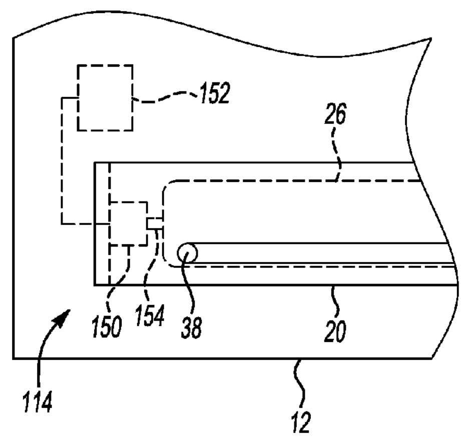
FIG. 7 is a schematic fragmentary plan view illustration of a vehicle roof with a second embodiment of a roof rack assembly having a bow member shown in a stowed positions within a roof rail and having an electronic solenoid actuator.
Figure 8:
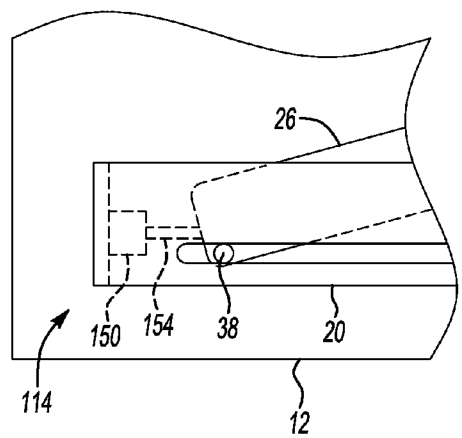
FIG. 8 is a schematic fragmentary plan view of the vehicle roof and roof rack assembly of FIG. 7 with the bow member partially pivoted toward a deployed position and the actuator actuated.

An electrically-powered solenoid-type actuator 150, shown in FIGS. 7 and 8, may be used in an alternative embodiment of a roof rail assembly 114. A power source 152 connected with an electronic controller (not shown) is controlled by the controller to selectively activate the actuator 150 to cause an armature 154 of the actuator 150 to extend, pushing the first bow member 26.

Figure 3:
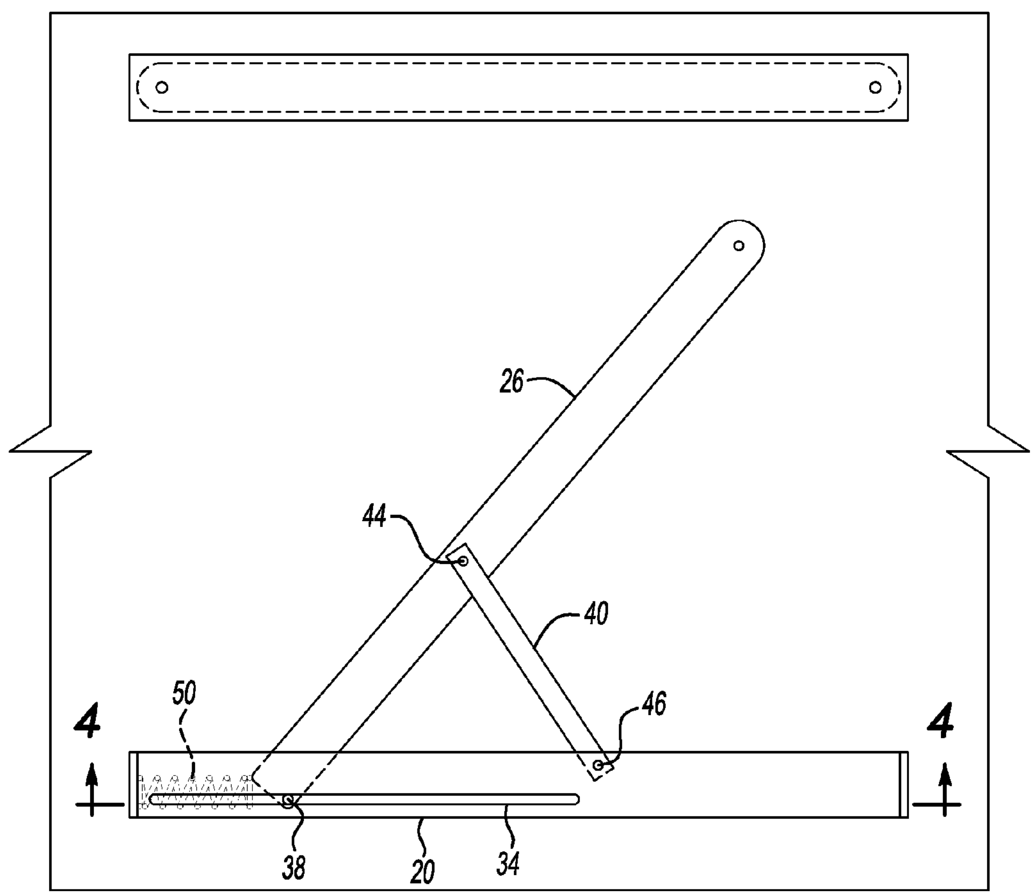
FIG. 3 is a schematic fragmentary illustration in plan view of the vehicle roof with the roof rack assembly of FIGS. 1 and 2 showing the bow member of one of the roof rails partially pivoted from the stowed position and translating in a slot within the roof rail.
Figure 4:
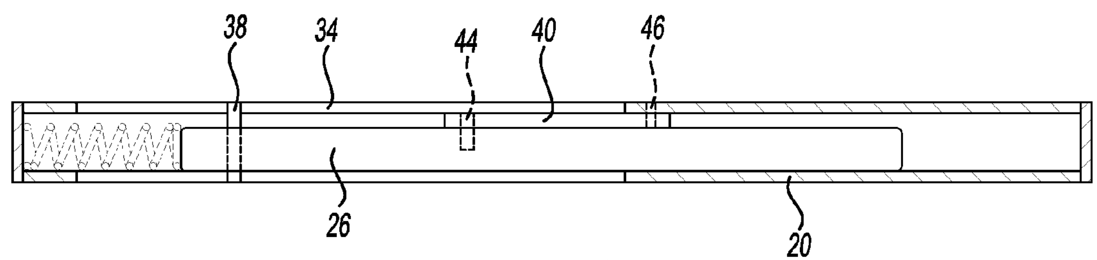
FIG. 4 is a schematic partially cross-sectional side view illustration of the roof rail and bow member of FIG. 3 taken at lines 4-4 in FIG. 3.

Referring again to FIG. 1, the second bow member 30 has a fourth pivot member 60 that pivotally connects the second bow member 30 to the second roof rail 22. The second bow member 30 is selectively locked to the second roof rail 22 via another depressible pin 53. The second bow member 30 may be pivoted about the fourth pivot member 60 to the deployed position shown in FIG. 5 when the first bow member 26 is almost or completely pivoted to the deployed position. The first and second bow members 26, 30 may be positioned at slightly offset heights to allow them to pivot past one another without interfering. Furthermore, the end of the second bow member 30 fits in the cavity 24 to be locked to the second roof rail 20 with another depressible pin 53 that is positioned to avoid interfering with the actuator 50. For example, as shown in FIGS. 3 and 5, the actuator 50 occupies only a portion of the width of the cavity 24 when not compressed.

Figure 5:
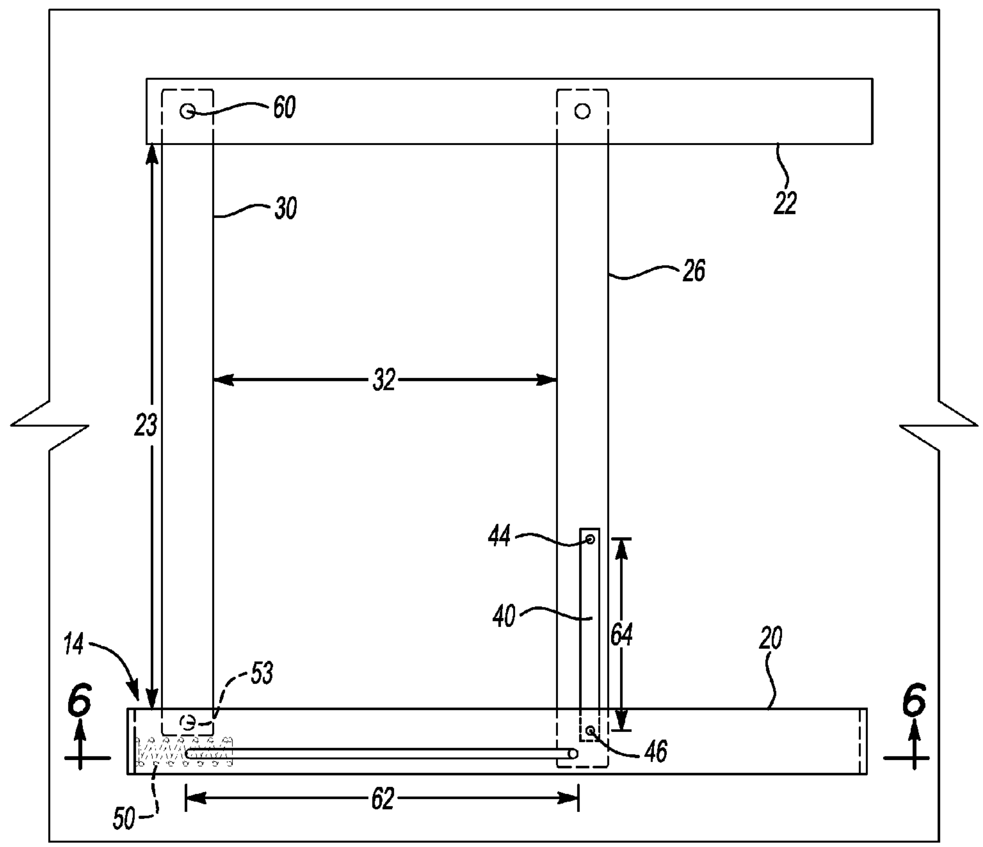
FIG. 5 is a schematic fragmentary illustration in plan view of the vehicle roof with the roof rack assembly of FIGS. 1 through 4 showing the bow member of one of the roof rails pivoted to a deployed position and translated along the slot.
Figure 6:
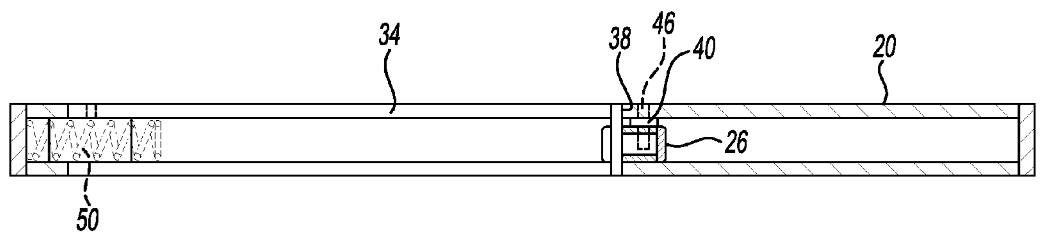
FIG. 6 is a schematic partially cross-sectional side view illustration of the roof rail and bow member of FIG. 5 taken at lines 6-6 in FIG. 5.

Referring again to FIG. 1, the linkage member 40 is aligned substantially parallel with the first slot 34 when the first bow member 26 is in the stowed position of FIG. 1, and substantially perpendicular with the first slot 34 in the deployed position of FIG. 5. Because the linkage member 40 and slot 34 are configured in this manner, with the linkage member 40 and the first bow member 26 both pivoting ninety degrees from the stowed position to the deployed position, the first bow member 26 translates a distance 62 (the entire length of slot 34) which is twice the distance 64 between the second pivot member 44 and the third pivot member 46 via the first pivot member 38 traveling in the slot 34 as shown in FIG. 5.

Figure 9:
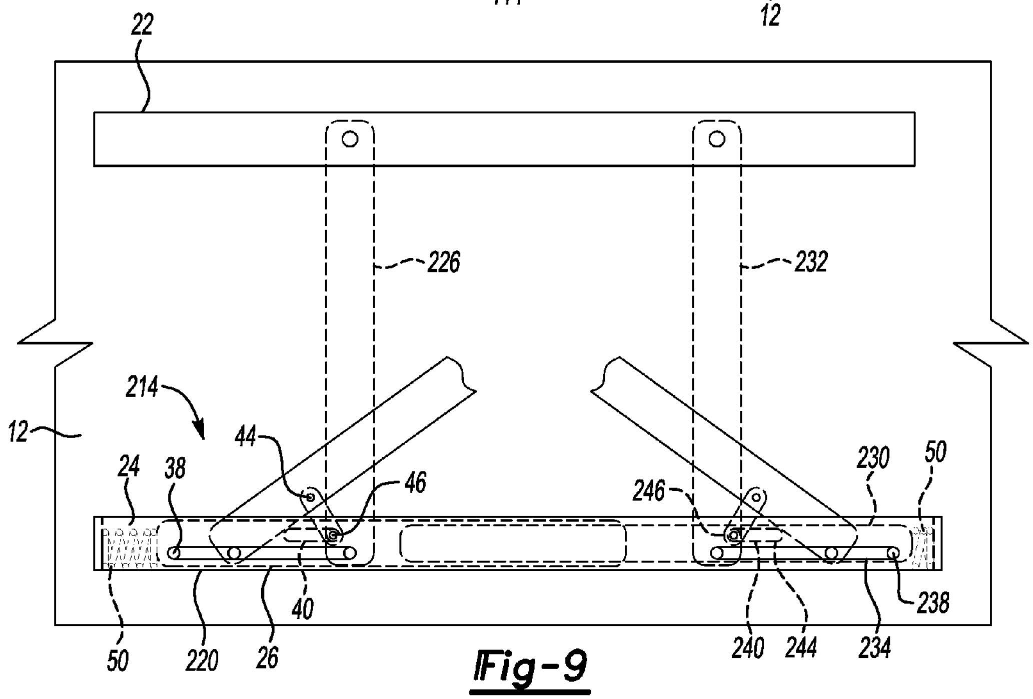
FIG. 9 is a schematic fragmentary plan view illustration of a third embodiment of a vehicle roof with a roof rack assembly showing bow members in phantom nested within each other in stowed positions and partially pivoted (shown in solid) toward deployed positions also shown in phantom.

FIG. 9 shows another embodiment of a roof rack assembly 214 for use on the vehicle roof 12 of FIG. 1. The first roof bow member 26 is shown in phantom in the stowed position nested in the cavity 24, and is connected with the linkage member 40 and with a first roof rail 20 via pivot members 38, 44 and 46 as described above. An actuator 50 urges the first bow member 26 toward the deployed position, shown in phantom as 226. The first bow member 26 is shown in solid in a partially deployed position.

The first roof rail 220 is C-shaped, opening toward the second roof rail 22. The first bow member 26 is also C-shaped, opening toward the second roof rail 22. A second bow member 230 nests within the first bow member 26 in the first roof rail 220 when in the stowed position. Thus, there is no bow member stowed in the second roof rail 22. The second bow member 230 is pivotally connected to the first roof rail 220 with a fourth pivot member 238 at a second slot 234 in the first roof rail 220, and is biased toward a deployed position 232 by another actuator 50. The second bow member 230 is also pivotally connected to a second linkage member 240 at a fifth pivot member 244 and to the first roof rail 220 at sixth pivot member 246. The bow members 26, 230 pivot outward from the stowed positions in opposing directions, as is evident in FIG. 9. When in the final deployed positions 226, 232, shown in phantom spanning between the first roof rail 220 and the second roof rail 22, the first bow member 26 and the second bow member 230 have translated toward each other (i.e., the first bow member 26 translates rearward and the second bow member 230 translates forward). Because both of the first and the second bow members 26, 230 are nested in the same first roof rail 20, fewer components may be necessary for electrically-powered actuation. For example, a single power source may be positioned near the first roof rail 20, and less wiring is required from a common controller and power source to the actuators 50. Depressible locking pins like locking pins 53 described above may be used to retain the first bow member 26 and the second bow member 230 in the respective stowed or deployed positions.

While the best modes for carrying out the invention have been described in detail, those familiar with the art to which this invention relates will recognize various alternative designs and embodiments for practicing the invention within the scope of the appended claims.

The invention claimed is:

1. A roof rack assembly for a vehicle roof comprising:

a first roof rail and a second roof rail spaced a first distance from one another on the vehicle roof; wherein the first roof rail has a first slot extending partially along a length of the first roof rail;

a first bow member connected at a first pivot member to the first roof rail at the first slot;

a first linkage member with a first portion connected at a second pivot member to the first bow member and a second portion connected at a third pivot member to the first roof rail; wherein the first linkage member pulls the first pivot member toward the third pivot member so the first bow member translates in the first slot as the first bow member is pivoted away from the first rail from a stowed position substantially parallel with the first roof rail to a deployed position in which the first bow member spans the first distance between the first and second roof rails.

2. The roof rack assembly of claim 1, further comprising an actuator operable to at least partially pivot the first bow member toward the deployed position.

3. The roof rack assembly of claim 2, wherein the actuator is a spring positioned between the first roof rail and the first bow member and biasing the first pivot member toward the second pivot member.

4. The roof rack assembly of claim 2, wherein the actuator is an electrically-powered solenoid.

5. The roof rack assembly of claim 1, wherein the first roof rail forms a cavity extending at least partially along the length of the first roof rail; and wherein the first bow member is at least partially nested within the cavity when in the stowed position.

6. The roof rack assembly of claim 1, further comprising:

a second bow member pivotably connected to one of the first roof rail and the second roof rail and pivotable from a stowed position substantially parallel with the one of the first roof rail and the second roof rail to a deployed position in which the second bow member spans the first distance between the first and the second roof rails; and wherein a second distance between the first bow member and the second bow member when deployed is less than the first distance between the first and second roof rails due to the translation of the first bow member.

7. The roof rack assembly of claim 6, wherein the second bow member is pivotably connected to the first roof rail and pivots outward from the first roof rail to the deployed position in an opposite direction than the first bow member.

8. The roof rack assembly of claim 6, wherein one of the first and the second bow members nests within the other of the first and the second bow members when both are in the stowed positions.

9. The roof rack assembly of claim 6, wherein the first roof rail has a second slot; wherein the second bow member is pivotably connected at a fourth pivot member to the first roof rail at the second slot;

a second linkage member with one portion connected at a fifth pivot member to the first roof rail and another portion connected at a sixth pivot member to the first bow member; wherein the second linkage pulls the fourth pivot member toward the fifth pivot member so the second bow member translates in the second slot as the second bow member is pivoted away from the first roof rail from a stowed position substantially parallel with the second roof rail to a deployed position in which the second bow member spans the first distance between the first and second roof rails.

10. The roof rack assembly of claim 9, wherein the first bow member and the second bow member translate toward one another when moving from the respective stowed positions to the respective deployed positions.

11. The roof rack assembly of claim 1, wherein the first linkage member is aligned substantially parallel with the first slot when the first bow member is in the stowed position and is substantially perpendicular with the first slot when the first bow member is in the deployed position so that the first bow member translates substantially twice a distance between the second and third pivot members.

12. A roof rack assembly comprising:

a first roof rail and a second roof rail spaced a first distance from one another;

a first bow member pivotally connected by a first pivot pin to the first roof rail; wherein the first roof rail has a slot in which the first pivot pin translates along the first roof rail as the first bow member is pivoted with respect to the first roof rail;

a linkage member with a first portion connected at a second pivot pin fixed to the first bow member and a second portion connected at a third pivot pin fixed to the first roof rail; wherein a first end of the first bow member pivots away from the first rail as the first bow member translates along the first roof rail via the first pivot pin translating in the slot so the first bow member extends from a stowed position substantially parallel with the first roof rail to a deployed position in which the first bow member spans the first distance between the first and second roof rails;

a second bow member pivotably connected at a first portion to one of the first and the second roof rails to pivot from a stowed position substantially parallel with the one of the first and the second roof rails to a deployed position in which the second bow member spans the first distance between the first and the second roof rails; and wherein a second distance between the first and the second bow members when deployed is less than the first distance between the first and second roof rails due to the translation of the first bow member.

13. The roof rack assembly of claim 12, further comprising an actuator operable to at least partially pivot the first bow member toward the deployed position.

14. The roof rack assembly of claim 13, wherein the actuator is a spring positioned between the first roof rail and the first bow member and biasing the first pivot member toward the second pivot member.

15. The roof rack assembly of claim 13, wherein the actuator is an electrically-powered solenoid.

16. The roof rack assembly of claim 12, wherein the first roof rail forms a cavity extending at least partially along a length of the first roof rail; and wherein the first bow member is at least partially nested within the cavity when in the stowed position.

* * * * *